Oct. 21, 1941.　　　　　E. E. MOYER　　　　　2,260,046
ELECTRIC VALVE SYSTEM FOR DYNAMOELECTRIC MACHINES
Filed Dec. 1, 1939　　　　2 Sheets-Sheet 1

Inventor:
Elmo E. Moyer,
by Harry E. Dunham
His Attorney.

Patented Oct. 21, 1941

2,260,046

UNITED STATES PATENT OFFICE 2,260,046

ELECTRIC VALVE SYSTEM FOR DYNAMO-ELECTRIC MACHINES

Elmo E. Moyer, Scotia, N. Y., assignor to General Electric Company, a corporation of New York Application December 1, 1939, Serial No. 307,068

12 Claims. (Cl. 172—274)

My invention relates to electric valve systems and more particularly to control or protective systems for electric valves employed as exciters for dynamo-electric machines.

Electric valve apparatus has been found very satisfactory for energizing the field windings of dynamo-electric machines due to the precision of control which the electric valves afford. By using electric valves of the controlled type whereby the average current conducted or the average output voltage is accurately controllable, it is possible to obtain precise control of operating characteristics of dynamo-electric machines. The use of electric valve means in systems of this nature has made it necessary to develop new and improved control circuits to facilitate the use of electric valves in these systems. In accordance with the teachings of my invention described hereinafter, I provide new and improved control systems whereby electric valve apparatus may be applied with greater facility to regulating systems for dynamo-electric machines.

It is an object of my invention to provide new and improved electric valve translating systems.

It is another object of my invention to provide new and improved electric valve systems for energizing the field windings of a dynamo-electric machine, such as the field windings of synchronous motors or synchronous condensers.

It is a further object of my invention to provide new and improved protective systems for electric valve apparatus which is employed as an exciter for the field winding of a synchronous condenser.

Briefly stated, in the illustrated embodiments of my invention I provide new and improved electric valve exciters for energizing the field winding of a synchronous condenser. The system includes protective apparatus to maintain the electric valves nonconducting during a part of the starting sequence and to assure connection of the exciter to the field winding at a precise time during the starting sequence.

Figure 1:
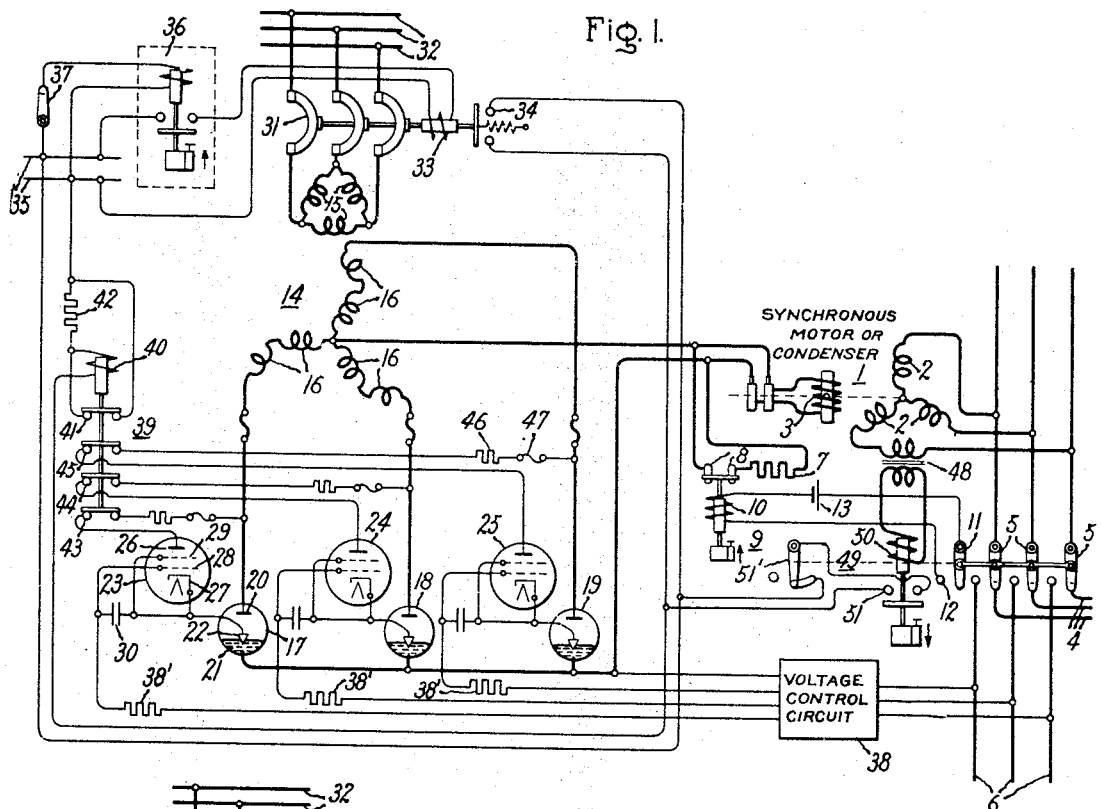
Figure 2:
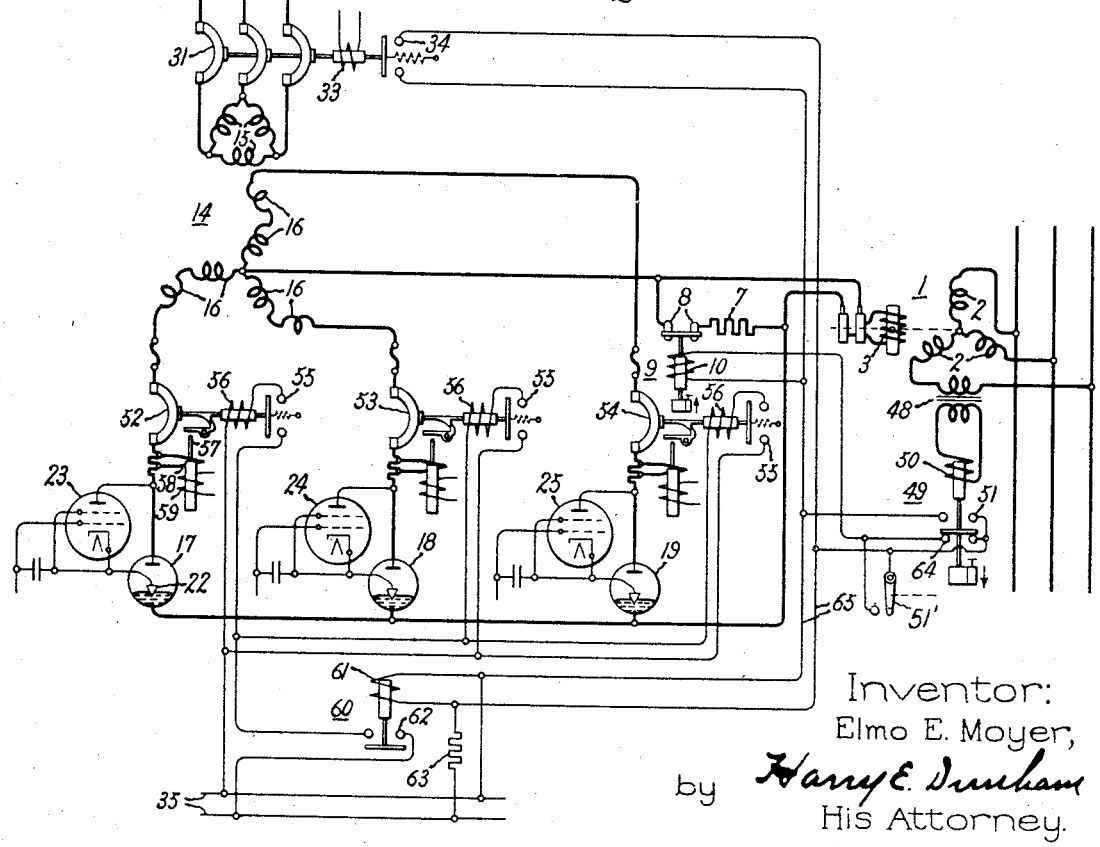
Figure 3:
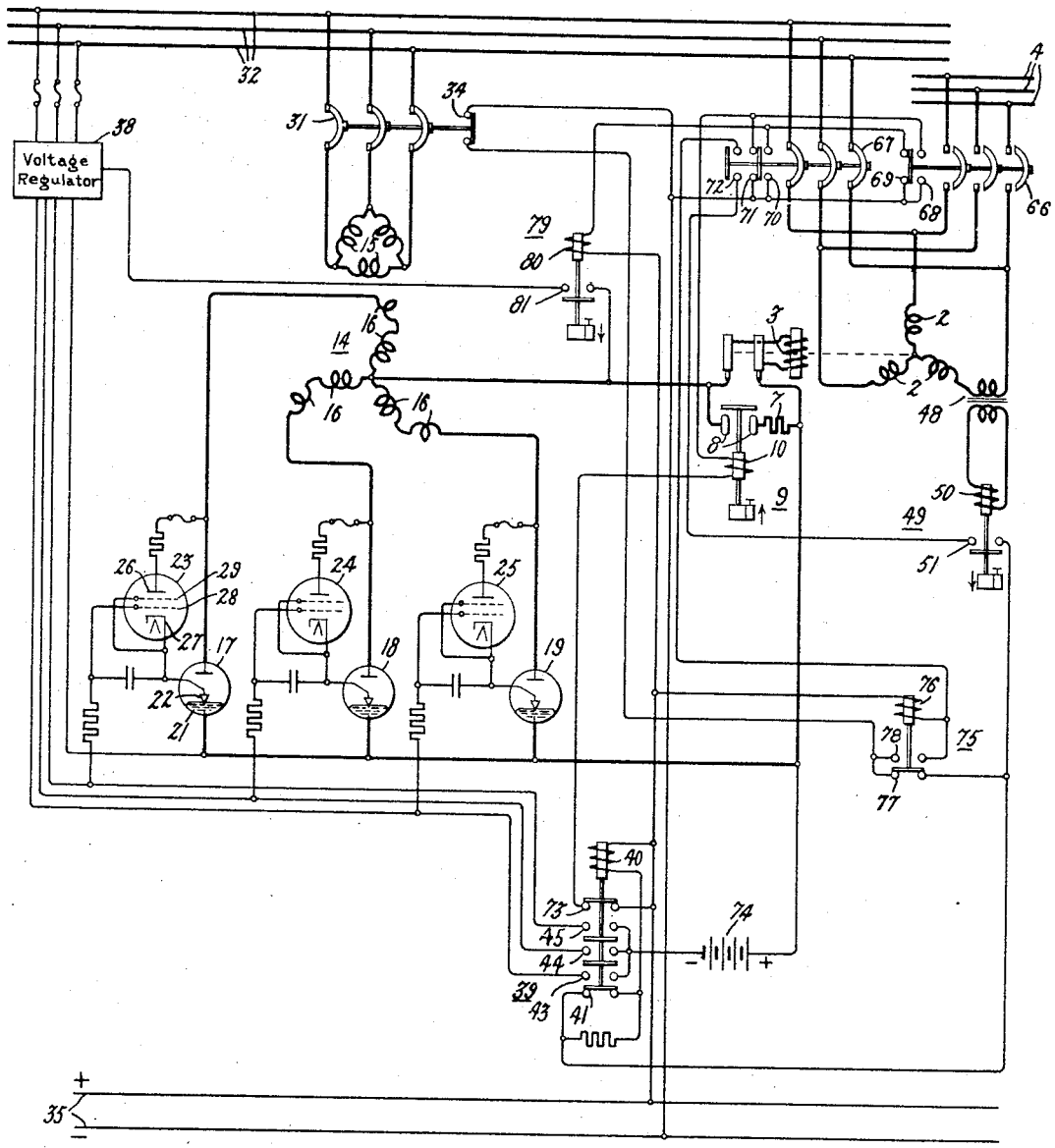

For a better understanding of my invention, reference may be had to the following description taken in connection with the accompanying drawings, and its scope will be pointed out in the appended claims. Figs. 1 and 3 diagrammatically illustrate embodiments of my invention as applied to an electric valve exciter for energizing the field winding of a synchronous condenser in which the main electric valves are provided with trigger or control electric valves and in which the protective apparatus is associated with the control valves. Fig. 2 diagrammatically illustrates a modification of the arrangement of Fig. 1 in which the protective apparatus is connected to or associated with the main or power electric valves.

Referring now to Fig. 1 of the accompanying drawings, my invention is there illustrated as applied to an electric valve system for energizing the field winding of a dynamo-electric machine such as a synchronous condenser 1. The synchronous condenser 1 comprises a plurality of armature windings 2 and a field winding 3. In order to start the synchronous condenser 1, I provide a source 4 of alternating voltage of reduced value which may be connected to the armature windings 2 during the starting operation by means of a circuit breaker 5. During normal operation, the armature windings 2 are connected to an alternating current circuit 6 of normal or nominal voltage.

When starting the synchronous condenser 1 as an induction motor, I provide means for shunting the field winding 3 during the starting operation. This shunting means may comprise a resistance 7 and a pair of normally closed contacts 8 which are connected in series relation across the terminals of the field winding 3. The contacts 8 may be operated by a suitable time delay relay 9 arranged to open with a time delay but arranged to close substantially coil 10. The alternating current circuit breaker 5 may be provided with an auxiliary switch 11 having a contact 12 which is open and maintained open during the off and starting positions of the breaker 5 and closed in the running position, so that the actuating coil 10 is energized from a suitable source of current, such as a battery 13, in the running position of the breaker 5.

I provide an electronic or electric valve exciter for energizing the field winding 3, and the exciter comprises an inductive network including a transformer 14 having a plurality of primary windings 15 and a plurality of secondary windings 16. The exciter also includes a plurality of main or power electric valves 17, 18 and 19 which are preferably of the type employing an ionizable medium and each comprises an anode 20, a mercury pool cathode 21 and a make-alive or immersion igniter control member 22. The immersion igniter control members 22 are each of semi-conducting material such as boron-carbide or silicon-carbide and have an extremity thereof immersed in the associated mercury pool cathodes 21. The electric valves are rendered conductive by the transmission of current of a predetermined value through the control members. I employ a plurality of excitation circuits including control electric valves 23-25. The control electric valves 23-25 are also preferably of the type employing an ionizable medium and each comprises an anode 26, a cathode 27 and a control grid 28 and a shield grid 29 which may be connected to the cathode. A suitable transient voltage absorbing means, such as a capacitance 30, may be associated with each of the control valves. The control electric valves 23-25 are each connected to be responsive to the anode voltage of its associated power valve.

A suitable switching means 31 may be connected between the transformer 14 and a suitable source of alternating current 32 to effect energization of the exciter. Of course, if desired, the exciter may be energized from the alternating current circuit 6. The switching means 31 is biased to the open-circuit position and provided with an actuating coil 33 and also includes a pair of auxiliary contacts 34 which are arranged to be closed when the switching means 31 is in the open position. The actuating coil 33 may be energized from any suitable source of current, such as a direct current source 35, through a time delay relay 36 and a switch 37. Switch 37 and switch 11 may be mechanically interconnected so that switch 37 is closed in the starting and running positions of the circuit breaker 5.

I employ a suitable or conventional voltage regulating circuit 38 for controlling the conductivities of the control valves 23-25 and hence to control the energization of the field winding 3 in response to the voltage of circuit 6. Current limiting resistances 38' may be connected in series relation with the control grids 28.

As a means for preventing transmission of current by the main valves 17-19 and the control valves 23-25 during the starting operation in which the synchronous condenser 1 is operating as an induction motor and before it reaches synchronous speed, I provide protective apparatus for maintaining these electric valves in a non-conducting condition during that period. The protective apparatus may comprise a relay or contactor 39 having an actuating coil 40, a pair of contacts 41 for short circuiting a resistance 42 connected in series relation with the coil 40 on pick-up, and pairs of contacts 43, 44 and 45 connected in series relation with the anode-cathode circuits of control electric valves 23-25, respectively. Current limiting resistances 46 and current protective means, such as fuses 47, may be connected in series relation with each of the anode-cathode circuits of the control valves 23-25.

In order to control the contactor 39 so that it maintains the electric valves 23-25 and 17-19 in a non-conducting condition during the starting operation of the synchronous condenser 1, I provide suitable means responsive to a predetermined operating condition of the condenser, such as a current transformer 48 and a current responsive relay 49, to effect energization of the actuating coil 40 so long as the armature current of the condenser 1 remains above a predetermined value. The relay 49 is provided with an actuating coil 50 and a pair of normally open contacts 51 and is arranged to open with a time delay. A switch 51' may be connected in circuit with contacts 51 of relay 49 and connected to be operated in response to circuit breaker 5 so that coil 40 of contactor 39 will not be energized due to a current transient which occurs after the circuit breaker 5 is in the running position. That is, switch 51' assures that current will be transmitted to the field winding 3 when the circuit breaker 5 is in the running position, even though a transient in armature current may be caused when circuit breaker 5 is changed from the starting to the running position.

The operation of the embodiment of my invention shown in Fig. 1 will be explained by considering the system during the initiation of operation of the synchronous condenser 1. Prior to the operation of the circuit breaker 5, it will be understood that since the contacts 8 of the relay 9 are normally closed, the field winding 3 of the condenser 1 will be short circuited through the resistance 7. Furthermore, since the switching means 31 is in the open-circuit position, the auxiliary contacts 34 thereof will be closed, effecting energization of the actuating coil 40 of the contactor 39 so that the anode-cathode circuits of the control electric valves 23-25 are not completed, thereby maintaining the control valves and the associated main power valves 17-19 in a nonconducting condition. The actuating coil 40 is, of course, energized from the circuit 35.

To start the rotation of the synchronous condenser 1, the circuit breaker 5 is moved to the right-hand position to connect the armature windings 2 to the source 4 of reduced voltage. Of course, the switch 11 is operated simultaneously therewith and the switch 37 is also closed at this time, effecting energization of the time delay relay 36. As soon as the source of reduced voltage is connected to the armature windings 4, it will be understood by those skilled in the art that the synchronous condenser will begin to rotate, operating as an induction motor. As soon as the armature windings 2 are connected to the source 4, the armature current will rise to a relatively high value, effecting operation of the current relay 49 to close contacts 51 thereby providing an additional path for the energization of the actuating coil 40 of the contactor 39. The time delay relay 36 is arranged or timed to operate to effect energization of the actuating coil 33 of switching means 31 after closure of contacts 51 of relay 49, thereby assuring energization of the coil 40 of contactor 39.

As the speed of the synchronous condenser increases, the armature current of the condenser decreases thereby affording an indication of the speed of the condenser. As the speed of the synchronous condenser 1 approaches synchronous speed and the armature current correspondingly decreases, the relay 49 opens its contacts 51 with a time delay, thereby effecting deenergization of the coil 40 of contactor 39 and closing the anode-cathode circuits of the trigger valves 23-25. Upon operation of the contactor 39, the control members 22 of the power valves 17-19 are energized in a predetermined order so that unidirectional current is transmitted to resistance 7 and of the field winding of the synchronous condenser 1. The value of the unidirectional current transmitted is, of course, determined by the adjustment of the circuit 38. The relay 9 is adjusted to open its contacts 8 after operation of the contactor 39. Upon completion of the above described operations, the circuit breaker 5 is moved to the running position, thereby connecting the source 6 of nominal voltage to the armature windings 2. When circuit breaker 5 is moved to the running position, switch 51' is opened thereby assuring that coil 40 of contactor 39 will not be energized even though an armature current transient may be caused when the higher voltage is connected to the armature terminals. Of course, switch 51' also prevents the opening of contactor 39 if relay 49 operates in response to current transients caused by load variations. Thereafter, the electric valve exciter operates to transmit variable amounts of unidirectional current to the field winding of the synchronous condenser to maintain the voltage of circuit 6 at a predetermined value. In the above described operation, it will be understood that the electric valve equipment is protected during the starting operation and that the transmission of unidirectional current to the field winding 3 is initiated at a very precise point in the starting sequence of operation.

I have found that where the electric valves employ immersion-igniter control members and the control members are connected to the anodes of the valves, the electric valves will conduct current during the starting operation by virtue of the voltage drop appearing across the resistance 7. As will be readily appreciated, if the electric valves transmit current to the field winding during the starting operation, before the synchronous condenser approaches synchronous speed, the transient condition imposed upon the associated alternating current circuits will be excessive. Accordingly, I provide means for delaying the transmission of unidirectional current to the field winding until the desired instant in the starting sequence, thereby substantially eliminating or reducing the transient which would be occasioned by the untimely transmission of unidirectional current to the field winding.

In Fig. 2 there is shown a modification of my invention which corresponds in many respects to the arrangement shown in Fig. 1 and corresponding elements have been assigned like reference numerals. In the circuit arrangement of Fig. 2, the protective means for the electric valves 17-19 is connected directly in the anode-cathode circuits of the main or power valves 17-19. These protective means may constitute individual contactors 52, 53 and 54 connected in the anode-cathode circuits of power electric valves 17-19, respectively. The contactors 52-54 may be spring biased to the open-circuit positions and each comprises a pair of auxiliary contacts 55 which are closed when the anode contactor is in the open-circuit position. Each of the anode contactors 52-54 also comprises a closing coil 56 and a tripping means comprising an armature 57, a current coil 58 and an independent trip coil 59. The current coil 58 is arranged to open the contactor when the current transmitted by the associated main valve attains a predetermined value. Of course, by the use of polarizing means well known in the art, the anode contactors may be made to operate selectively in response to reverse current occasioned by arc-back of the electric valve means.

The closing coils 56 of contactors 52-54 are connected to be energized from the auxiliary source of current 35 through a relay 60 having an actuating coil 61 and a pair of contacts 62. When the coil 61 is connected to circuit 35 through a current limiting resistance 63, the relay 60 is closed to effect energization of the closing coils 56 and hence closes the anode contactors 52-54.

During the starting operation, it is of course desired to maintain the anode contactors 52-54 in the open-circuit positions and this condition is obtained by shunting the actuating coil 61 of relay 60 by either the auxiliary contacts 34 of switching means 31 or by means of contacts 51 of the current relay 49. After the closure of the switching means 31 and after the current decreases below the predetermined value as the speed of the synchronous condenser increases, the coil 61 is energized thereby closing its contacts 62 and energizing closing coil 56 of the contactors 52-54. The contactors are locked in the closed positions.

In the arrangement of Fig. 2, the relay 9 is connected to be energized through a pair of auxiliary contacts 64 provided by the current relay 49. The actuating coil 10 of the relay 9 is connected to be energized from the auxiliary circuit 35 through conductors 65.

The operation of the embodiment of my invention shown in Fig. 2 will be explained by considering the system during the starting sequence. Initially, of course, the switch means 31 is in the open-circuit position, effecting closure of auxiliary contacts 34. When the auxiliary contacts 34 are closed, the actuating coil 61 of relay 60 is short-circuited so that the anode contactors 52-54 are maintained in the open-circuit position. Furthermore, the closure of the auxiliary contacts 34 of which means 31 short circuits the actuating coil 10 of the relay 9, assuring that the field winding 3 is short circuited through the resistance 7. After the connection of the source of reduced voltage to the armature winding 2, the current relay 49 picks up, closing contacts 51 and still further assuring that the actuating coil 61 of relay 60 is shorted. Subsequently, the actuating coil 33 of the switching means 31 is energized and connects the transformer 14 to circuit 32. When the armature current decreases to a predetermined value as the speed of the synchronous condenser increases, the relay 49 drops out opening contacts 51 and closing contacts 64. Upon closure of contacts 64, the timing operation of the relay 9 is initiated. Upon opening of the contacts 51, the actuating coil 61 of relay 60 is energized and relay 60 closes its contacts 62 to effect energization of the closing coils 56 of the anode contactors 52-54. Relay 60 remains in the closed-circuit position so long as auxiliary contacts 34 and 51 are open. After closure of the contactors 52-54, a unidirectional current of predetermined value is transmitted to the field winding 3 and resistance 7. After a definite time, depending upon the setting of the relay 9, the contacts 8 of relay 9 are opened. The starting operation is then completed by connecting the source of nominal voltage to the armature windings 2. In this embodiment of my invention, switch 51' which is operated by the circuit breaker 5 or in accordance with the position of breaker 5, is arranged to be maintained in the closed circuit position so long as the breaker 5 is in the running position. Accordingly, energization of coil 10 of relay 9 is assured to prevent closure of contacts 8 under variable load conditions of the condenser 9.

In the event of an overload on any one of the main valves 17-19 or in the event of arcback of a valve, the armature member 57 will be actuated to trip the associated anode contactor. Upon being moved to the open circuit position, the auxiliary contacts 55 will be closed to effect energization of the closing coil 56, thereby resetting the contactor.

Fig. 3 diagrammatically illustrates another embodiment of my invention which is similar in many respects to that shown in Fig. 1 and corresponding elements have been assigned like reference numerals. In this embodiment of my invention, I provide apparatus for maintaining the trigger or control electric valves non-conductive by impressing hold-off or biasing potentials on the control grids thereof during the starting operation to assure that unidirectional current is not transmitted to the field winding 3 of the synchronous condenser. Instead of using a single circuit breaker for starting the synchronous condenser 1, I may employ a pair of circuit breakers 66 and 67 for connecting the alternating current circuits 4 and 32, respectively, to the armature windings 2. Circuit breaker 66 is provided with auxiliary contacts 68 and 69, and circuit breaker 67 is provided with auxiliary contacts 70, 71 and 72.

The contactor 39 in the arrangement of Fig. 3 is employed to impress suitable biasing potentials, such as a negative unidirectional biasing potential, on the control grids 28 of the control electric valves 23—25 during the starting operation. Contactor 39 is also provided with an additional set of contacts 73, the function of which is to be explained hereinafter. A suitable source of negative biasing potential, such as a battery 74, may be employed to furnish the negative biasing potential.

The auxiliary contacts 34 of the circuit breaker 31 are arranged to be closed when the breaker is in the closed circuit position. I provide a suitable means, such as a relay 75 having an actuating coil 76 and contacts 77 and 78 to seal in the contactor 39 in the energized position so long as the current relay 49 is in the closed circuit position, thereby assuring that the control valves 23–25 are maintained nonconductive so long as the armature current transient exists. As a means for connecting the voltage regulator 38 operatively to the system and particularly to the control electric valves 23–25, I provide a relay 79 having an actuating coil 80 and a pair of contacts 81. Coil 80 is energized through contacts 69 of breaker 66 when that breaker is in the closed circuit position. In this manner it is assured that the voltage regulating circuit is connected to the control electric valves 23–25 upon the initiation of the starting sequence occasioned by the closure of circuit breaker 66.

The operation of the embodiment of my invention shown in Fig. 3 will be explained by considering the system during the starting operation. Upon closure of circuit breaker 66, actuating coil 80 of relay 79 will be energized to close contacts 81, thereby connecting the voltage regulating circuit 38 to the control electric valves 23–25. Subsequently, circuit breaker 31 is closed by a timing means similar to that shown in Fig. 1, closing the auxiliary contacts 34. The armature current transient occasioned by the connection of the low voltage source to the condenser 1 effects closure of contacts 51 of relay 49 and energizes the actuating coil 40 from circuit 35 through a circuit including the positive terminal of circuit 35 contacts 41, contacts 77 of relay 75, auxiliary contacts 34 of circuit breaker 31, to the negative terminal of circuit 35. Relay 49 thereby operates relay 75 which seals in contactor 39. Upon operation of contactor 39 to the energized position, contacts 43–35 are closed connecting the negative terminal of the battery 74 to control grids 28 of control electric valves 23–25, inclusive, thereby maintaining the control electric valves and the associated principal electric valves 17–19 in a nonconductive condition.

As soon as the armature current decreases to a predetermined value, the relay 49 drops out and opens the circuit for energizing actuating coil 40 of contactor 39. Accordingly, the negative unidirectional biasing potential impressed on the control grids 28 is removed and the electric valves 23–25 are in condition to transmit a predetermined value of unidirectional current to the field winding 3 and the shunt or discharge resistance 7 which is connected across the field winding 3 when contacts 73 of contactor 39 close to effect energization of the actuating coil 10 of relay 9. Subsequently, circuit breaker 67 is closed to connect the nominal or normal armature voltage to armature windings 2 of condenser 1. When in the closed circuit position, auxiliary contacts 71 of circuit breaker 67 are closed to energize coil 80 of relay 79, thereby assuring connection of the voltage regulating circuit 38 to the control electric valves 23–25. In this manner, the amount of current transmitted to the field winding 3 during the starting operation is pre-established. Relay 9 is designed to open its contacts 8 a predetermined interval of time after energization of actuating coil 10, thereby removing the shunt connection across the field winding 3 and effecting transmission of a predetermined amount of unidirectional current to the field winding 3 by electric valves 17–19.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a dynamo-electric machine of the synchronous type comprising an armature winding and a field winding, a source of current, translating apparatus for energizing said field winding from said source and comprising electric valve means having an anode-cathode circuit for transmitting current to said field winding, an electric circuit, means for connecting said armature winding to said circuit to initiate operation of said machine, and means connected in the anode-cathode circuit for maintaining said electric valve means nonconducting during the starting operation.

2. In combination, a dynamo-electric machine of the synchronous type comprising an armature winding and a field winding, a source of current, electric translating apparatus for energizing said field winding from said source and comprising an auxiliary inductive network and electric valve means having an anode-cathode circuit, an electric circuit, means for connecting said armature winding to said electric circuit to start said machine as an induction motor, and means for controlling the anode-cathode circuit of said electric valve means during the starting operation to prevent the transmission of current through said electric valve means due to the induction of voltage in said field winding during the starting operation.

3. In combination, a synchronous motor having an armature winding and a field winding, a source of current, electric translating apparatus for energizing said field winding from said source and comprising an inductive network and electric valve means having an anode, a cathode and an immersion-igniter control member, a control circuit for energizing said control member and comprising means energized in response to the anode voltage of said electric valve means, an electric circuit, means for connecting said armature winding to said electric circuit to start said motor as an induction motor, and means for preventing operation of said control circuit during the starting operation so that current is not transmitted to the control members.

4. In combination, a synchronous motor having an armature winding and a field winding, a source of current, electric translating apparatus for energizing said field winding from said source and comprising an inductive network and electric valve means for transmitting unidirectional current to said field winding, an electric circuit, means for connecting said armature winding to said electric circuit to start said motor as an induction motor, means for shunting said field winding during the starting operation, and means independent of the voltage of said armature winding and responsive to the current of said armature winding of said motor to maintain said electric valve means non-conducting during the starting operation.

5. In combination, a dynamo-electric machine of the synchronous type comprising an armature winding and a field winding, a source of current, electric translating apparatus for energizing said field winding from said source and comprising an inductive network and electric valve means, switching means for connecting said source to said inductive network, an electric circuit, starting means for connecting said armature winding to said electric circuit to initiate the operation of said machine, contactor means for connecting said electric valve means operatively in circuit with said field winding, and means for preventing operation of said switching means and said contactor means until a predetermined interval of time after the operation of said starting means.

6. In combination, a dynamo-electric machine of the synchronous type comprising an armature winding and a field winding, a source of current, electric translating apparatus for energizing said field winding from said source and comprising an inductive network and electric valve means, switching means for connecting said source to said inductive network, an electric circuit, starting means for connecting said armature winding to said electric circuit to initiate the operation of said machine, contactor means for connecting said electric valve means operatively in circuit with said field winding, and means for preventing operation of said contactor means until the armature current of said machine decreases to a predetermined value.

7. In combination, an alternating current dynamo-electric machine of the synchronous type comprising an armature winding and a field winding, an alternating current circuit, a source of alternating current of reduced voltage for starting said machine, an electric circuit, electric translating apparatus connected between said electric circuit and said field winding for transmitting power thereto and comprising an inductive network and electric valve means, switching means for connecting said inductive network to said electric circuit, means for shunting said field winding, protective means for preventing transmission of current by said electric valve means, means for connecting said armature winding to said source of reduced voltage to initiate the operation of said machine, means responsive to the armature current of said machine to maintain said protective means in operation so long as the armature current remains above a predetermined value, and means for operating said switching means and said protective means a predetermined interval of time after the initiation of the energization of said armature winding.

8. In combination, a dynamo-electric machine comprising an armature winding and a field winding, an electric circuit, a source of current, translating apparatus for energizing said field winding from said source and comprising electric valve means, said electric valve means having a control member for controlling the conductivity thereof, switching means for connecting said armature winding to said electric circuit to initiate the operation of said machine, and means responsive to the operation of said switching means and responsive to the magnitude of the armature current for maintaining said electric valve means in a nonconductive condition during the starting operation comprising means for impressing on said control member a biasing potential.

9. In combination, a dynamo-electric machine of the synchronous type comprisng an armature winding and a field winding, an alternating current circuit of normal voltage, an alternating current source of reduced voltage, circuit controlling means for selectively connecting said armature winding to said circuit or to source of reduced voltage, electric translating apparatus for transmitting unidirectional current to said field winding and comprising electric valve means having a control member for controlling the conductivity thereof, means responsive to said circuit controlling means for impressing a biasing potential on said control member to maintain said electric valve means nonconductive, and means responsive to the current of said armature winding for rendering inoperative said last mentioned means.

10. In combination, a dynamo-electric machine of the synchronous type having an armature winding and a field winding, a source of normal operating voltage, a source of reduced voltage for starting purposes, circuit controlling apparatus for selectively connecting said armature winding to either of said sources, electric translating apparatus for transmitting unidirectional current to said field winding and comprising electric valve means having a control member for controlling the conductivity thereof, a voltage regulating circuit for energizing said control member to pre-establish the value of current to be transmitted to said field winding, and means responsive to said circuit controlling means to connect said voltage regulating circuit operatively to said electric valve means.

11. In combination, a dynamo-electric machine of the synchronous type having an armature winding and a field winding, a source of normal operating voltage and a source of reduced voltage for starting purposes, circuit controlling means for selectively connecting said armature winding to said sources, electric translating apparatus for transmitting unidirectional current to said field winding and comprising electric valve means having a control member for controlling the conductivity thereof, a voltage regulating circuit for impressing on said control member a control voltage to pre-establish the value of current transmitted to said field winding, and means responsive to the current of said armature winding for maintaining said electric valve means nonconductive during the starting operation when said armature current exceeds a predetermined value.

12. In combination, a dynamo-electric machine of the synchronous type having an armature winding and a field winding, a source of normal operating voltage and a source of reduced voltage for starting purposes, circuit controlling means for selectively connecting said armature winding to said sources, electric translating apparatus for transmitting unidirectional current to said field winding and comprising electric valve means having a control member for controlling the conductivity thereof, a voltage regulating circuit for impressing on said control member a voltage to pre-establish the value of current transmitted to said field winding, means for impressing on said control member a hold-off voltage to maintain said electric valve means nonconductive, and means responsive to the current of said armature to render said last mentioned means ineffective when the armature current decreases to a predetermined value to permit said voltage regulator to control the conductivity of said electric valve means.

ELMO E. MOYER.

CERTIFICATE OF CORRECTION.

Patent No. 2,260,046.　　　　　　　　　　　　　　October 21, 1941.

ELMO E. MOYER.

It is hereby certified that error appears in the printed specification of the above numbered patent requiring correction as follows: Page 1, second column, line 29, after the word "substantially" insert --instantaneously upon deenergization of its actuating--; page 3, second column, line 20, for "switch" read --switching--; line 27, for the word "which" read --switch--; and line 65, for "9" read --1--; and that the said Letters Patent should be read with this correction therein that the same may conform to the record of the case in the Patent Office.

Signed and sealed this 9th day of December, A. D. 1941.

Henry Van Arsdale,
　　　　　　　　　　　　　　　　　　　　Acting Commissioner of Patents.

(Seal)